US009369320B2

(12) United States Patent  
Sturkovich et al.

(10) Patent No.: US 9,369,320 B2  
(45) Date of Patent: **\*Jun. 14, 2016**

(54) COMMUNICATION SYSTEM HAVING CROSS POLARIZATION INTERFERENCE CANCELLATION (XPIC)

(71) Applicant: Broadcom Corporation, Irvine, CA (US)

(72) Inventors: Yaacov Sturkovich, Netanya (IL); Eitan Tsur, Rishon Lezion (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,192

(22) Filed: May 20, 2015

(65) Prior Publication Data

US 2015/0326416 A1 Nov. 12, 2015

Related U.S. Application Data

(63) Continuation of application No. 13/853,672, filed on Mar. 29, 2013, now Pat. No. 9,059,876.

(60) Provisional application No. 61/753,352, filed on Jan. 16, 2013.

(51) Int. Cl.
*H04L 5/12* (2006.01)
*H04L 27/02* (2006.01)
*H04L 5/04* (2006.01)
*H04L 27/38* (2006.01)

(52) U.S. Cl.
CPC ........ *H04L 27/02* (2013.01); *H04L 5/04* (2013.01); *H04L 27/3863* (2013.01)

(58) Field of Classification Search
None
See application file for complete search history.

(56) References Cited

U.S. PATENT DOCUMENTS

2013/0128936 A1 5/2013 Kennard et al.
2014/0198867 A1 7/2014 Sturkovich et al.

OTHER PUBLICATIONS

Non-Final Rejection mailed Jul. 29, 2014 for U.S. Appl. No. 13/853,672, filed Mar. 29, 2013; 12 pages.
Notice of Allowance mailed Feb. 3, 2015 for U.S. Appl. No. 13/853,672, filed Mar. 29, 2013; 10 pages.

*Primary Examiner* — Adolf Dsouza
(74) *Attorney, Agent, or Firm* — Sterne, Kessler, Goldstein & Fox P.L.L.C.

(57) ABSTRACT

An all outdoor unit communication system, for performing cross polarization interference cancellation, is provided. The system includes a first outdoor unit (ODU) configured to receive a first directionally polarized signal, a first RF module configured to convert the first directionally polarized signal into a first in-phase (I) component and a first quadrature (Q) component, and a first modem configured to up-convert the first I and Q components from baseband into a first directionally polarized intermediate frequency (IF) signal. The system being configured to communicate, via an interconnect coupled to the first ODU, a second directionally polarized IF signal to the first ODU, and where the first modem is further configured to utilize the second directionally polarized IF signal to cancel out at least a portion of a first cross-polarization leakage at the first ODU.

23 Claims, 8 Drawing Sheets

COMMUNICATION SYSTEM HAVING CROSS POLARIZATION INTERFERENCE CANCELLATION (XPIC)

CROSS REFERENCE TO RELATED APPLICATIONS

This patent application is a continuation of U.S. patent application Ser. No. 13/853,672, filed Mar. 29, 2013, which claims the benefit of U.S. Provisional Patent Application No. 61/753,352, filed on Jan. 16, 2013, which are both incorporated herein by reference in their entireties.

BACKGROUND

1. Field of the Disclosure

The disclosure generally relates to point-to-point (PtP) wireless links, and more specifically to an outdoor unit (ODU) configuration incorporating a cross connect architecture.

2. Related Art

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a coaxial interconnect. The IDU in a conventional split ODU configuration typically includes a modem, a digital-to-analog converter (DAC) and a baseband-to-intermediate frequency converter. Under normal operation, these conventional split ODU configurations generally involve transmitting an analog signal, at an intermediate frequency (IF), over the coaxial interconnect between the IDU and the ODU.

In some instances, all ODU configurations have been used as an alternative to these conventional split ODU configurations. Conventional all ODU configurations include only an ODU, and thus do not include an IDU. The ODU therefore includes a modem, a DAC as well as a baseband-to-radio frequency converter.

All ODU configurations are generally implemented having either a superheterodyne architecture or a direct conversion architecture. The superheterodyne architecture, which has been a popular all ODU architecture in the area of mobile backhaul networking, typically utilizes an analog-to-digital converter (ADC) to sample a full signal bandwidth of interest. In particular, a series of passive and active components including transformers, mixers, amplifiers, attenuators, and active and passive filters are needed to down-convert the carrier radio frequency (RF) to either a low or high intermediate frequency (IF) for sampling, while also maintaining signal integrity. Conversely, with a direct conversion architecture, rather than using a single ADC to sample an IF signal, the carrier frequency is directly converted to two baseband signals, I and Q, which are then sampled by one or more ADCs.

Traditionally, the majority of consumer demand in the area of mobile backhaul networking has been directed to voice services. However, recently the market for mobile backhaul services has begun to change. In particular, the mobile backhaul space is experiencing a growing demand for increased capacity as well as a shift from voice services to data services. These factors are driving mobile backhaul networks towards high capacity Internet Protocol (IP)/Ethernet connections.

Similarly, mobile backhaul networking is experiencing a transition to fourth generation (4G) standard and Long Term Evolution (LTE) networks. This transition is also driving the need for higher capacity, and is moving more packet traffic onto mobile backhaul networks. It is because of this transition that the mobile backhaul space has begun to shift away from superheterodyne architectures and towards direct conversion architectures, which generally provide decreased power consumption, smaller size, and a lower cost of production.

Additionally, in an effort to meet the growing demand for increased capacity, mobile backhaul networks have begun to implement systems that can handle higher capacity communications. For example, some mobile backhaul networks have begun to utilize spatial multiplexing, and/or multiple-input multiple-output (MIMO) techniques. However, these high capacity communication techniques generally require the use of multiple all ODU receivers. However, this approach can cause various I/Q mismatches, which may include, but are not limited, to phase and gain I/Q mismatch, group delays between the I and Q signals, and frequency select mismatches. Each of these I/Q mismatches can result in noise floors, which may prevent the all ODU receivers from operating at a high quadrature amplitude modulation (QAM).

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 7:
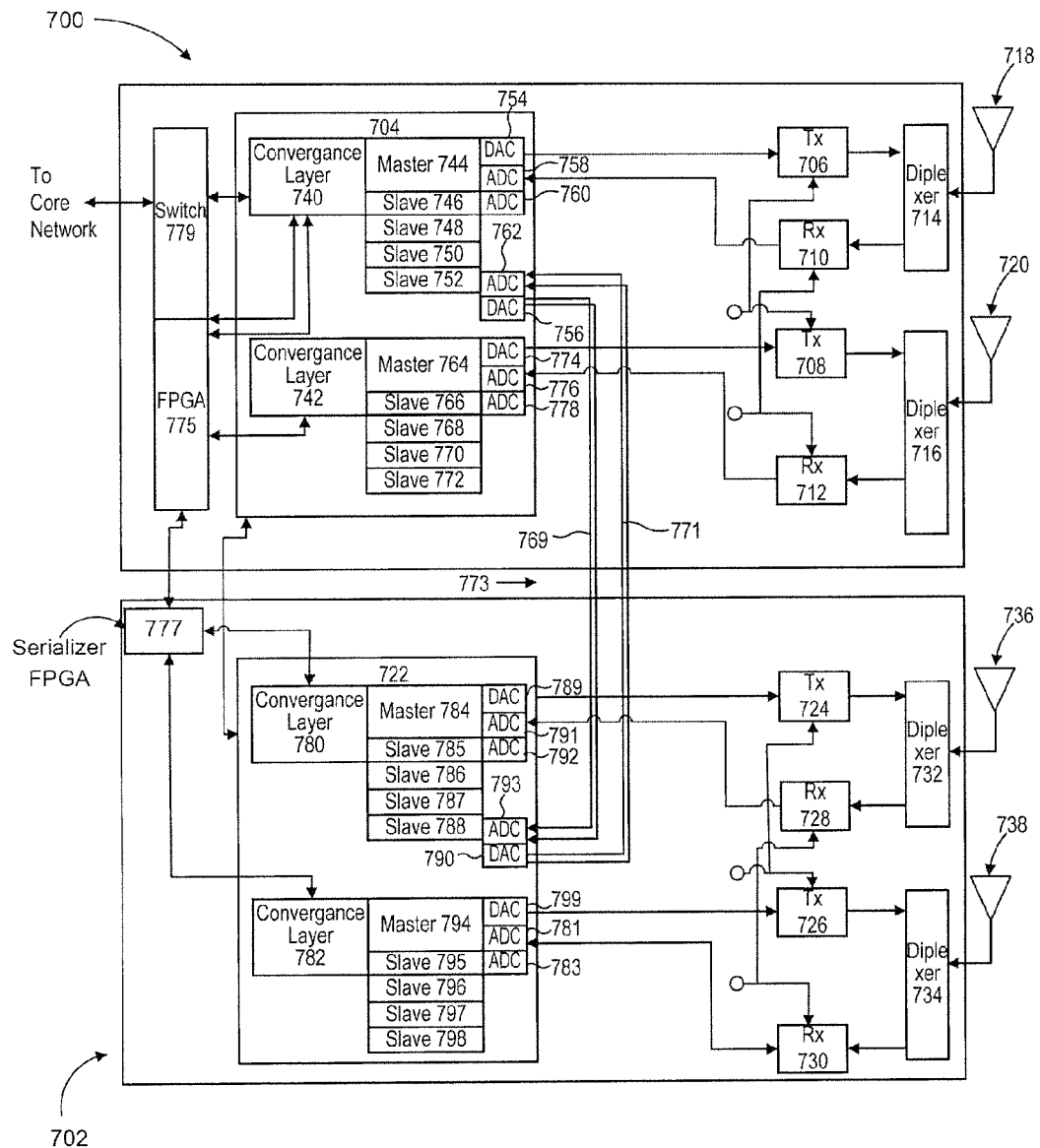
Figure 8:
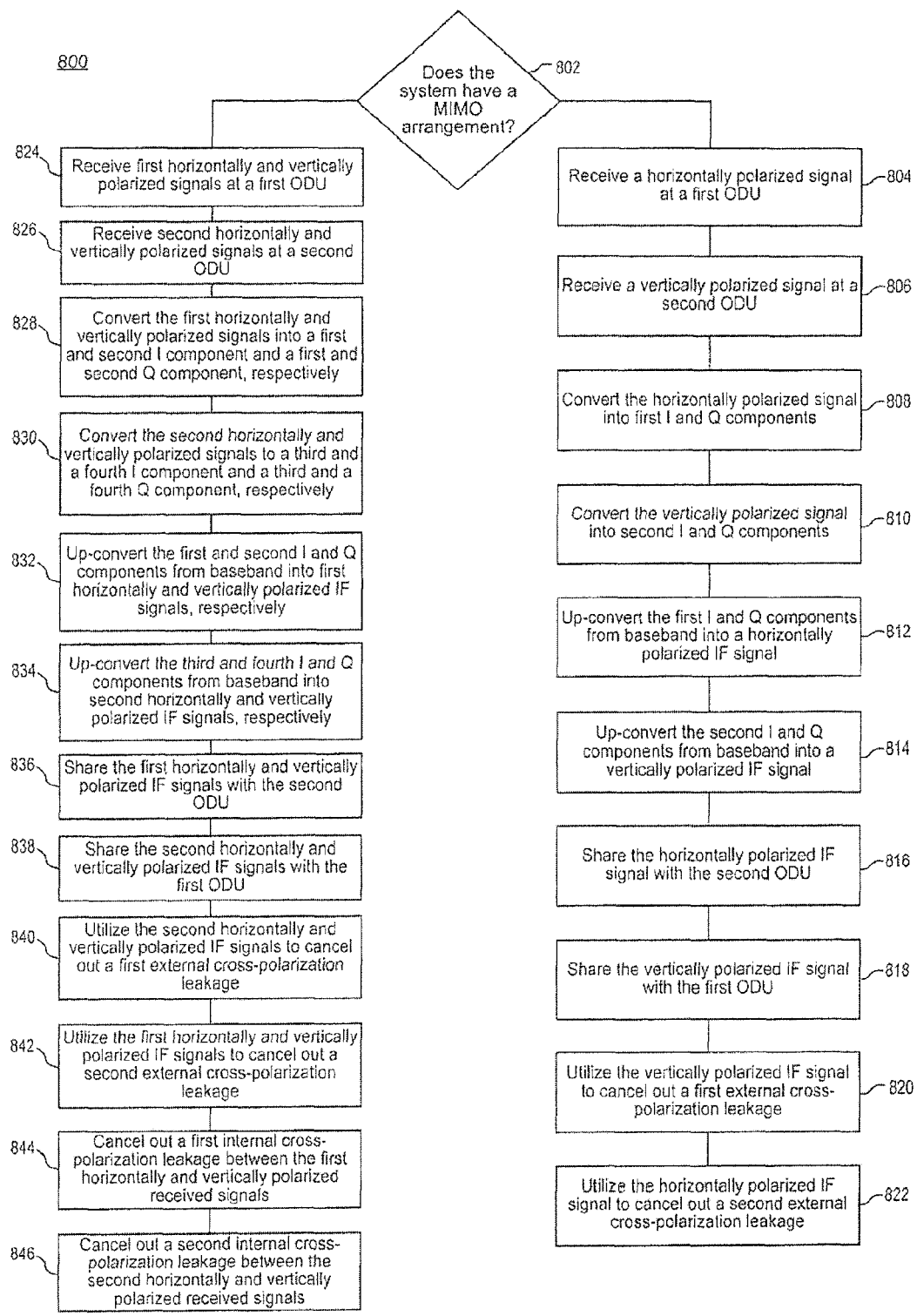

FIG. 7 illustrates a block diagram of a pair of ODUs, each having a direct conversion architecture, configured to perform XPIC and to utilize a multiple-input and multiple-output (MIMO) arrangement according to an exemplary embodiment of the present disclosure; and FIG. 8 is a flowchart of exemplary operational steps of optimizing communication within a high capacity all ODU microwave backhaul system, having a direct conversion architecture, according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary all ODU Microwave Backhaul System

Figure 1:
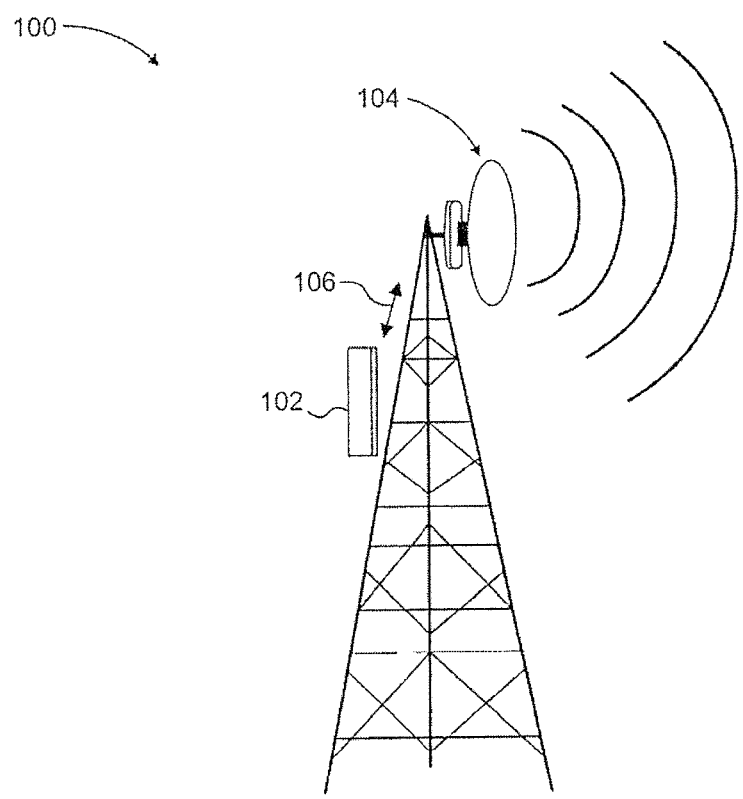
FIG. 1 illustrates a block diagram of an all ODU microwave backhaul system according to an exemplary embodiment of the present disclosure.

FIG. 1 illustrates a block diagram of an all outdoor unit (ODU) microwave backhaul system 100 that includes an ODU 102 according to an exemplary embodiment of the present disclosure. Microwave communications, as used throughout this disclosure, refers to both terrestrial point-to-point (PtP) radio communications, as well as point-to-multipoint communications, and can include both wired and/or wireless communications.

All ODU microwave backhaul system 100 initiates communication by accessing an information source. To facilitate this communication in all ODU microwave backhaul system 100, ODU 102 is coupled to the core network (not shown in FIG. 1). Therefore, ODU 102 is configured to acquire one or more sequences of digital data (e.g., audio data, video data, data transmitted over IP/Ethernet connection, or the like) directly from the core network. ODU 102 can be configured to support several additional services, such as Ethernet, time-division multiplexing (TDM), and control data that is aggregated over a radio link.

In some embodiments, ODU 102 can be implemented at a substantially elevated location, such as on top of a pole, on top of an antenna tower, on top of a building, or the like. Additionally, an antenna 104 can be communicatively coupled to ODU 102, and can be positioned substantially close to ODU 102. Therefore, all ODU microwave backhaul system 100 may be implemented such that data 106 can be transmitted from ODU 102 to antenna 104, where communication over a wireless link can then be initiated. Also, all ODU microwave backhaul system 100 is implemented such that data 106 received over the wireless link by antenna 104 can be transmitted to ODU 102.

Although the description of the all ODU configurations are to be described in terms of microwave backhaul architecture, those skilled in the relevant art(s) will recognize that the present disclosure can be applicable to other architectures without departing from the spirit and scope of the present disclosure.

An Exemplary ODU Having a Direct Conversion Architecture

Figure 2:
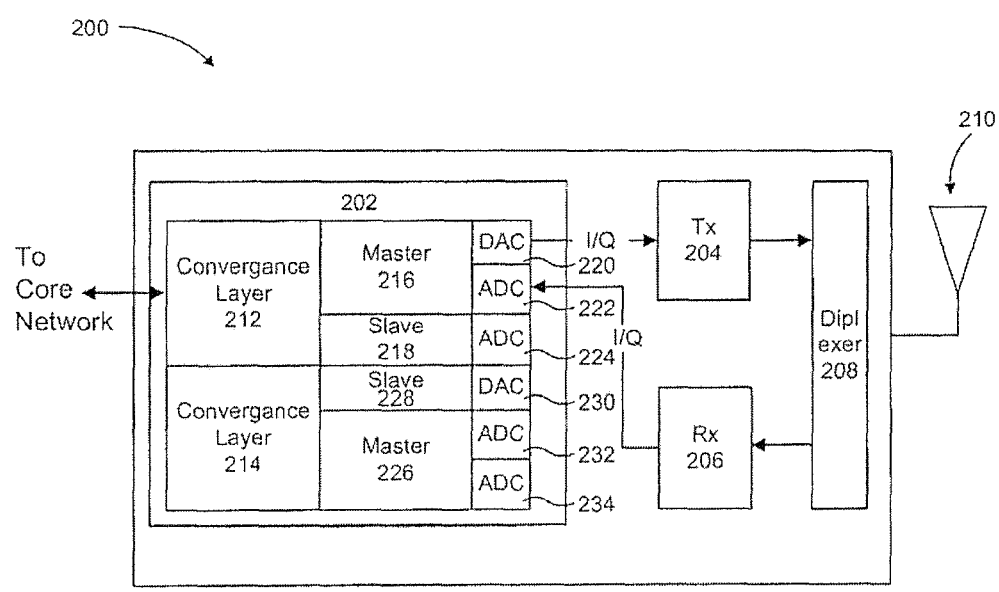
FIG. 2 illustrates a block diagram of an ODU having a direct conversion architecture according to an exemplary embodiment of the present disclosure.

FIG. 2 illustrates a block diagram of an ODU 200 having a direct conversion architecture according to an exemplary embodiment of the present disclosure. ODU 200 can represent an exemplary embodiment of ODU 102 of FIG. 1.

As discussed above, a direct conversion architecture is characterized by the fact that a carrier frequency is directly converted to two baseband signals, I and Q, which are then sampled by one or more ADCs. This is in contrast to a conventional superheterodyne architecture, which typically utilizes an analog-to-digital converter (ADC) to sample a full signal bandwidth of interest, and thus utilizes a series of passive and active components including transformers, mixers, amplifiers, attenuators, and active and passive filters to down-convert the carrier radio frequency (RF) to either a low or high intermediate frequency (IF) for sampling.

ODU 200 includes a modem 202, an RF transmission block (Tx) 204, an RF reception block (Rx) 206, and a diplexer 208. Further, ODU 200 may be communicatively coupled to an antenna 210.

In some embodiments, modem 202 may be implemented as a point-to-point (PtP) high-end modem having a networking integrated circuit (IC). Modem 202 may also include a first convergence layer 212 and a second convergence layer 214. Each convergence layer 212 and 214 may refer to a top portion of a protocol that functions to format data originating in higher layers for processing by the lower layers. Specifically, convergence layers 212 and 214 may be configured to add a header or wrap data in a header and trailer that contain information necessary to provide the necessary services. For example, error control and/or priority information may be added by convergence layers 212 and 214. Additionally, convergence layer 212 may be associated with a master chip 216 and a slave chip 218. Further, convergence layer 212 may also be associated with a digital-to-analog converter (DAC) 220 and multiple analog-to-digital converters (ADCs) 222 and 224. Similarly, convergence layer 214 may be associated with a master chip 226 and a slave chip 228, and may also be associated with a DAC 230 and multiple ADCs 232 and 234.

During operation, ODU 200 may receive a signal over a wireless link via antenna 210. In some embodiments, the received signal may be an RF signal, and may have a frequency in the range of approximately 6 GHz to approximately 43 GHz. The received signal may then be input into diplexer 208, which may then output the received signal to Rx 206, without causing any interference with a transmission signal received at diplexer 208 from Tx 204. In particular, diplexer 208 may be configured to allow both Tx 204 and Rx 206 to share a common wireless link. Rx 206 may be configured to directly convert the received RF signal to two baseband signals, I and Q. The I and Q signals may then be input to ADC 222, where the I and Q signals are sampled and converted from the analog domain to the digital domain. Modem 202 may be configured to perform various digital processing techniques on the received I and Q signals. For example, modem 202 may be configured to digitally filter the received I and Q signals, to perform adaptive digital pre-distortion techniques, to correct noise and/or errors in the received I and Q signals, or the like. Modem 202 may then output the digitally processed I and Q signals to the core network.

An Exemplary Dual Channel all ODU Microwave Backhaul System

Figure 3:
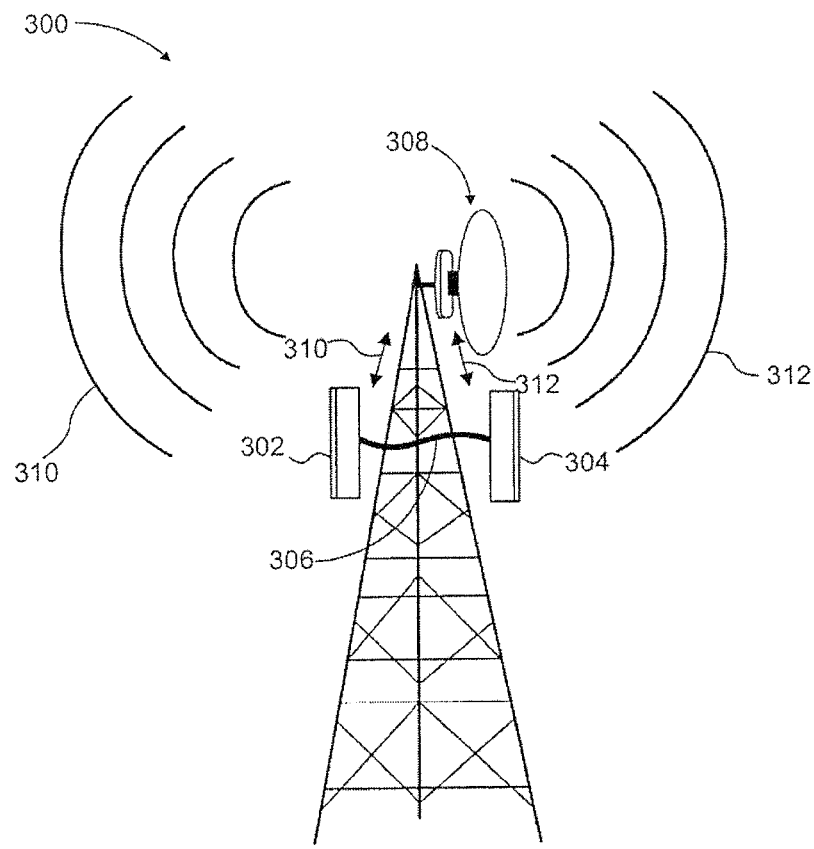
FIG. 3 illustrates a block diagram of a dual channel all ODU microwave backhaul system according to an exemplary embodiment of the present disclosure.

FIG. 3 illustrates a block diagram of a dual channel all ODU microwave backhaul system 300 according to an exemplary embodiment of the present disclosure. As discussed above, in an effort to meet the growing demand for increased capacity, mobile backhaul networks have begun to implement systems that can handle double capacity communications.

Accordingly, dual channel all ODU microwave backhaul system 300 represents a double capacity system that supports a full cross polarization interference cancellation (XPIC) configuration.

Similar to all ODU microwave backhaul system 100 (shown in FIG. 1), dual channel all ODU microwave backhaul system 300 initiates communication by accessing an information source. To facilitate this communication in system 300, ODU 302 is coupled to the core network (not shown in FIG. 3). ODU 302 may also be implemented as a direct conversion ODU. Therefore, ODU 302 may be configured to acquire one or more sequences of digital data (e.g., audio data, video data, data transmitted over IP/Ethernet connection, or the like) directly from the core network. ODU 302 can be configured to support several additional services, such as Ethernet, time-division multiplexing (TDM), and control data that is aggregated over a radio link.

Dual channel all ODU microwave backhaul system 300's full XPIC configuration can allow system 300 to have approximately double the capacity of a single channel configuration. In particular, in additional to ODU 302, dual channel all ODU microwave backhaul system 300 includes a second ODU 304. ODUs 302 and 304 are each communicatively coupled to an antenna 308. ODUs 302 and 304 are configured to facilitate the communication of two parallel communication channels over the same wireless link, where each of the two communication channel have orthogonal polarizations (e.g. horizontal and vertical). Additionally, or alternatively, ODU 304 may be coupled to the core network as well.

During operation, dual channel all ODU microwave backhaul system 300 may receive a signal having two orthogonal polarizations (e.g. horizontal 310 and vertical 312) at antenna 308. Horizontally polarized signal 310 may then be transmitted to ODU 302, while vertically polarized signal 312 may be transmitted to ODU 304. Additionally, horizontally polarized signal 310 and vertically polarized signal 312 may then be respectively processed by ODUs 302 and 304, as will be discussed in greater detail below.

However, although ODU 302 may be configured to receive and process horizontally polarized signal 310, a portion of vertically polarized signal 312 may leak into the actual signal received at ODU 302. Similarly, a portion of horizontally polarized signal 310 may leak into the actual signal received at ODU 304. These leakages may be collectively referred to as cross-polarization leakage herein. Each of these leakages may result in noise and/or errors being injected into the signals received at ODUs 302 and 304. Accordingly, an interconnect 306 may be implemented between ODUs 302 and 304 such that horizontally polarized signal 310 received at ODU 302 can be shared with ODU 304, and such that vertically polarized signal 312 received at ODU 304 can be shared with ODU 302. By allowing these received signals to be shared between ODUs 302 and 304, noise and/or errors that may be present within these signals can be substantially canceled out.

Interconnect 306 may be implemented using various different techniques. For example, interconnect 306 can comprise an Ethernet cable, a fiber optic cable, a coaxial cable, an intermediate frequency (IF) cable, a twisted pair cable, a shielded cable, a category 5 cable, a category 6 cable, or one or more copper wires.

An Exemplary Direct Conversion ODU Pair for Performing XPIC

Figure 4:
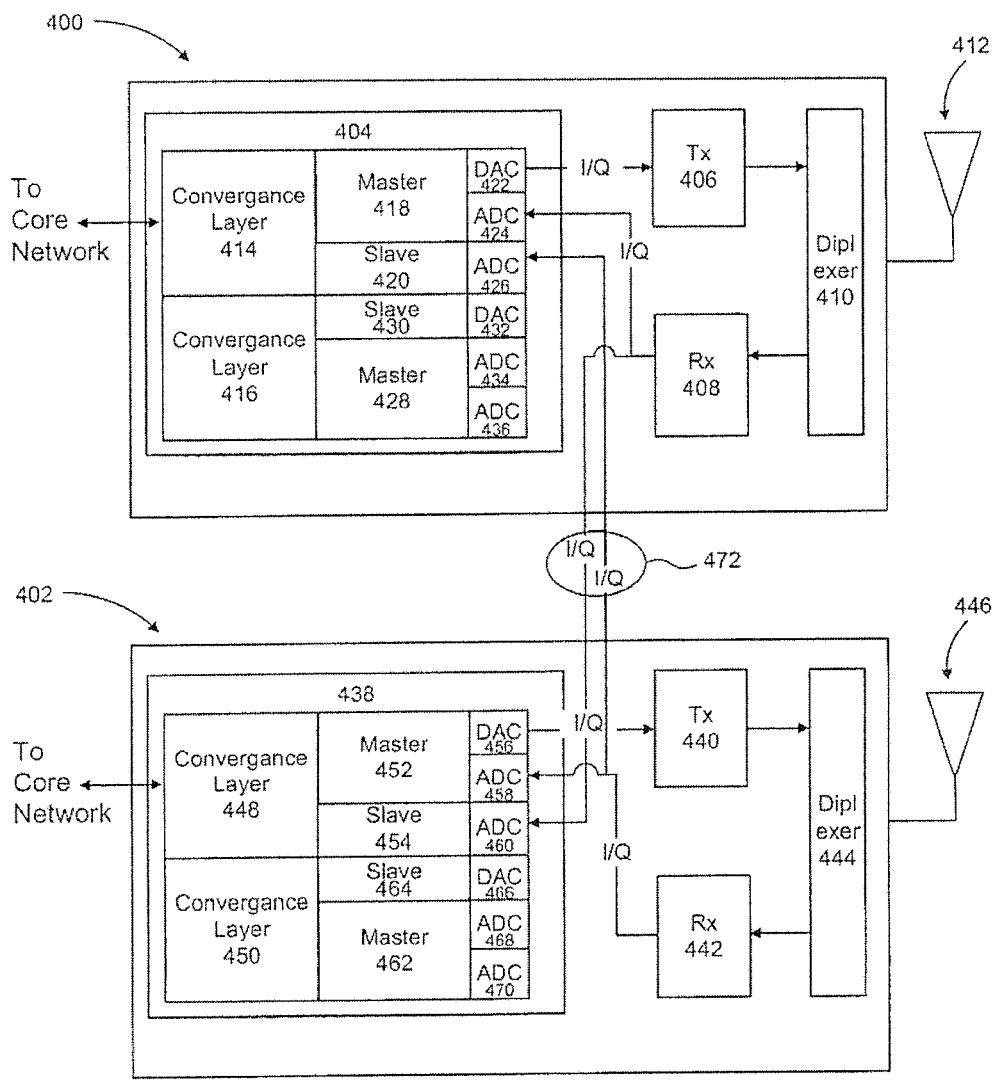
FIG. 4 illustrates a block diagram of a first pair of ODUs, each having a direct conversion architecture, configured to perform cross polarization interference cancellation (XPIC) according to an exemplary embodiment of the present disclosure.

FIG. 4 illustrates a block diagram of a first pair of ODUs 400 and 402, each having a direct conversion architecture, configured to perform cross polarization interference cancellation (XPIC) according to an exemplary embodiment of the present disclosure. ODUs 400 and 402 can represent exemplary embodiments of ODUs 302 and 304 of FIG. 3, respectively. Individually, ODUs 400 and 402 can each function in a substantially similar manner to ODU 200, which was discussed above with respect to FIG. 2.

Specifically, ODU 400 includes a modem 404, an RF transmission block (Tx) 406, an RF reception block (Rx) 408, and a diplexer 410. Additionally, modem 404 includes an I/Q interface that is configured to exchange in-phase (I) and quadrature (Q) components between Tx 406 and Rx 408. Further, ODU 400 may be communicatively coupled to an antenna 412.

Similarly, ODU 402 includes a modem 438, an RF transmission block (Tx) 440, an RF reception block (Rx) 442, and a diplexer 444. Further, ODU 402 may be communicatively coupled to an antenna 446.

In some embodiments, modem 404 may be implemented as a point-to-point (PtP) high-end modem having a networking integrated circuit (IC). Modem 404 may also include a first convergence layer 414 and a second convergence layer 416. Each convergence layer 414 and 416 may refer to a top portion of a protocol that functions to format data originating in higher layers for processing by the lower layers. Specifically, convergence layers 414 and 416 may be configured to add a header or wrap data in a header and trailer that contain information necessary to provide the necessary services. For example, error control and/or priority information may be added by convergence layers 414 and 416. Additionally, convergence layer 414 may be associated with a master chip 418 and a slave chip 420. Further, convergence layer 414 may also be associated with a DAC 422 and multiple ADCs 424 and 426. Similarly, convergence layer 416 may be associated with a master chip 428 and a slave chip 430, and may also be associated with a DAC 432 and multiple ADCs 434 and 436.

Modem 438 may also be implemented as a point-to-point (PtP) high-end modem having a networking IC. Modem 438 may include a first convergence layer 448 and a second convergence layer 450. Each convergence layer 448 and 450 may function in a substantially similar manner to first and second convergence layers 414 and 416 discussed above. Additionally, convergence layer 448 may be associated with a master chip 452 and a slave chip 454. Further, convergence layer 448 may also be associated with a DAC 456 and multiple ADCs 458 and 460. Similarly, convergence layer 450 may be associated with a master chip 462 and a slave chip 464, and may also be associated with a DAC 466 and multiple ADCs 468 and 470.

During operation, ODU 400 may receive a signal over a wireless link via antenna 412. In some embodiments, the signal received by ODU 400 may be a horizontally polarized signal. Additionally, the horizontally polarized signal may be an RF signal, and may have a frequency in the range of approximately 6 GHz to approximately 43 GHz. The horizontally polarized signal may be input into diplexer 410, which may then output the horizontally polarized signal to Rx 408, without causing any interference with a transmission signal received at diplexer 410 from Tx 406. In particular, diplexer 410 may be configured to allow both Tx 406 and Rx 408 to share a common wireless link. Rx 408 may be configured to directly down-convert the horizontally polarized RF signal to two baseband signals, I and Q. Although the disclosure is not limited to direct conversion. The I and Q signals may then be input to ADC 424, where the I and Q signals are sampled and converted from the analog domain to the digital domain. Modem 404 may be configured to perform various digital processing techniques on the received I and Q signals. For example, modem 404 may be configured to digitally filter the received I and Q signals, to perform adaptive digital pre-distortion techniques, to correct noise and/or errors in the received I and Q signals, or the like. Modem 404 may then output the digitally processed I and Q signals to the core network.

In some embodiments, ODU 402 may operate in a substantially similar manner to ODU 400. However, the signal received by ODU 402 may be a vertically polarized RF signal having a frequency in the range of approximately 6 GHz to approximately 43 GHz. Therefore, during operation, the vertically polarized signal may be input into diplexer 444, which may then output the vertically polarized signal to Rx 442 without causing any interference with a transmission signal received at diplexer 444 from Tx 440. Rx 442 may be configured to directly down-convert the vertically polarized RF signal to two baseband signals, I and Q. Although, the disclosure is not limited to direct conversion. The I and Q signals may then be input to ADC 458, where the I and Q signals are sampled and converted from the analog domain to the digital domain. Similar to modem 404, modem 438 may also be configured to perform various digital processing techniques on the received I and Q signals. For example, modem 438 may also be configured to digitally filter the received I and Q signals, to perform adaptive digital pre-distortion techniques, to correct noise and/or errors in the received I and Q signals, or the like. Modem 438 may also be configured to output the digitally processed I and Q signals to the core network.

However, although ODU 400 may be configured to receive and process the horizontally polarized signal, a portion of the vertically polarized signal may leak into the actual signal received at ODU 400. Similarly, a portion of the horizontally polarized signal may leak into the actual signal received at ODU 402. Each of these leakages may result in noise and/or errors being injected into the signals received at ODUs 400 and 402. Accordingly, an interconnect 472 may be implemented between ODUs 400 and 402 such that the horizontally polarized signal received at ODU 400 can be shared with ODU 402, and such that the vertically polarized signal received at ODU 402 can be shared with ODU 400. By allowing these received signals to be shared between ODUs 400 and 402, noise and/or errors that may be present within these signals can be substantially canceled out. Interconnect 472 may be implemented using various different techniques. For example, interconnect 472 can comprise an Ethernet cable, a fiber optic cable, a coaxial cable, a twisted pair cable, a shielded cable, a category 5 cable, a category 6 cable, or one or more copper wires.

In some embodiments, to cancel out the unwanted noise and/or errors in each of the respective received signals, interconnect 472 may be configured to provide eight communication channels between ODUs 400 and 402. For example, interconnect 472 may include four communication channels for transmitting signals from ODU 400 to ODU 402, and may also include two communication channels (but possibly four conductors) for transmitting signals from ODU 402 to ODU 400. Specifically, the I signal generated by Rx 408 may include both an I+ signal and an I- signal (first channel), while the Q signal generated by Rx 408 may include a Q+ signal, and a Q- signal (second channel). (Herein, first and second differential signal components, or their corresponding conductors may be referred to as a channel.) Collectively, the I+, I-, Q+, and Q- signals represent the in-phase and quadrature components of the horizontally polarized signal received at ODU 400. These four signals (I+, I-, Q+, and Q-) are then transmitted from ODU 400 to ODU 402 using four of the conductors included within interconnect 472. The I+, I-, Q+, and Q- signals are then input into ADC 460, where the signals are sampled and converted from the analog domain to the digital domain. Modem 438 may be configured to utilize the necessary in-phase and quadrature components received from ODU 400 to cancel out the portion of the horizontally polarized signal that may have leaked into the vertically polarized signal received at ODU 402. For example, if the vertically polarized signal received at ODU 402 were to include an unwanted portion of the horizontally polarized signal, which may have both a positive in-phase component and a positive quadrature component, then modem 438 may cancel out the unwanted portion of the horizontally polarized signal by combining the I and Q signals received from Rx 442 with the corresponding negative in-phase and quadrature components received from ODU 400 via interconnect 472.

Similarly, any portion of the vertically polarized signal that may inadvertently leak into the horizontally polarized signal received at ODU 400 may also be canceled out. Specifically, the I signal generated by Rx 442 may also include both an I+ signal and an I- signal ($3^{rd}$ channel), while the Q signal generated by Rx 442 may also include a Q+ signal, and a Q- signal (fourth channel). Collectively, these I+, I-, Q+, and Q- signals generated by Rx 442 represent the in-phase and quadrature components of the vertically polarized signal received at ODU 402. These four signals (I+, I-, Q+, and Q-) are then transmitted from ODU 402 to ODU 400 using the four remaining communication conductors included within interconnect 472. The I+, I-, Q+, and Q- signals are then input into ADC 426, where the signals are sampled and converted from the analog domain to the digital domain. Similar to modem 438 discussed above, modem 404 then utilizes the necessary in-phase and quadrature components received from ODU 402 to cancel out the portion of the vertically polarized signal that may have leaked into the horizontally polarized signal received at ODU 400.

However, in some embodiments, sharing the I+, I-, Q+, and Q- signals between ODUs 400 and 402 via interconnect 472 can result in various I/Q mismatches. For example, sharing each of these eight signals across interconnect 472 can result in phase and gain I/Q mismatches. Phase and gain I/Q mismatches may cause insufficient attenuation in the image frequency band, which may lead to interference and degradation in the performance of the receivers, and in the quality of the received signals. In particular, phase and gain I/Q mismatches may occur if the phase between the I and Q components is not offset by exactly 90°, or may occur if the amplitudes of the I and Q components are not exactly equal. Additionally, sharing each of these eight signals across interconnect 472 can result in group delays between the I and Q components. In some embodiments, group delays can be caused when frequency selective components having different phase spectra are used. As another example, sharing each of the eight signals across interconnect 472 can result in frequency select mismatches. Frequency select mismatches may occur when the signals communicated across interconnect 472 occupy a wide frequency range. In such instances, a relatively good I/Q mismatch may be experienced as some frequencies within the frequency range, while a relatively bad I/Q mismatch may be experienced at other frequencies within the frequency range. In an embodiment, the signals communicated across interconnect 472 may have frequencies in the range of approximately 50 MHz to approximately 100 MHz. Each of these potential I/Q mismatches may result in noise floors, which may prevent ODUs 400 and 402 from operating at a high quadrature amplitude modulation (QAM).

Further, interconnect 472, which may be in the range of approximately a few centimeters to approximately a few meters in length, may be relatively expensive to implement. Interconnect 472 may also need to be implemented using precisely matched wires to facilitate the transmission of each of the eight I and Q components between ODUs 400 and 402. Accordingly, each of these factors may need to be carefully considered before implementing a double capacity microwave backhaul configuration where multiple I and Q components are shared between the ODUs.

Figure 5:
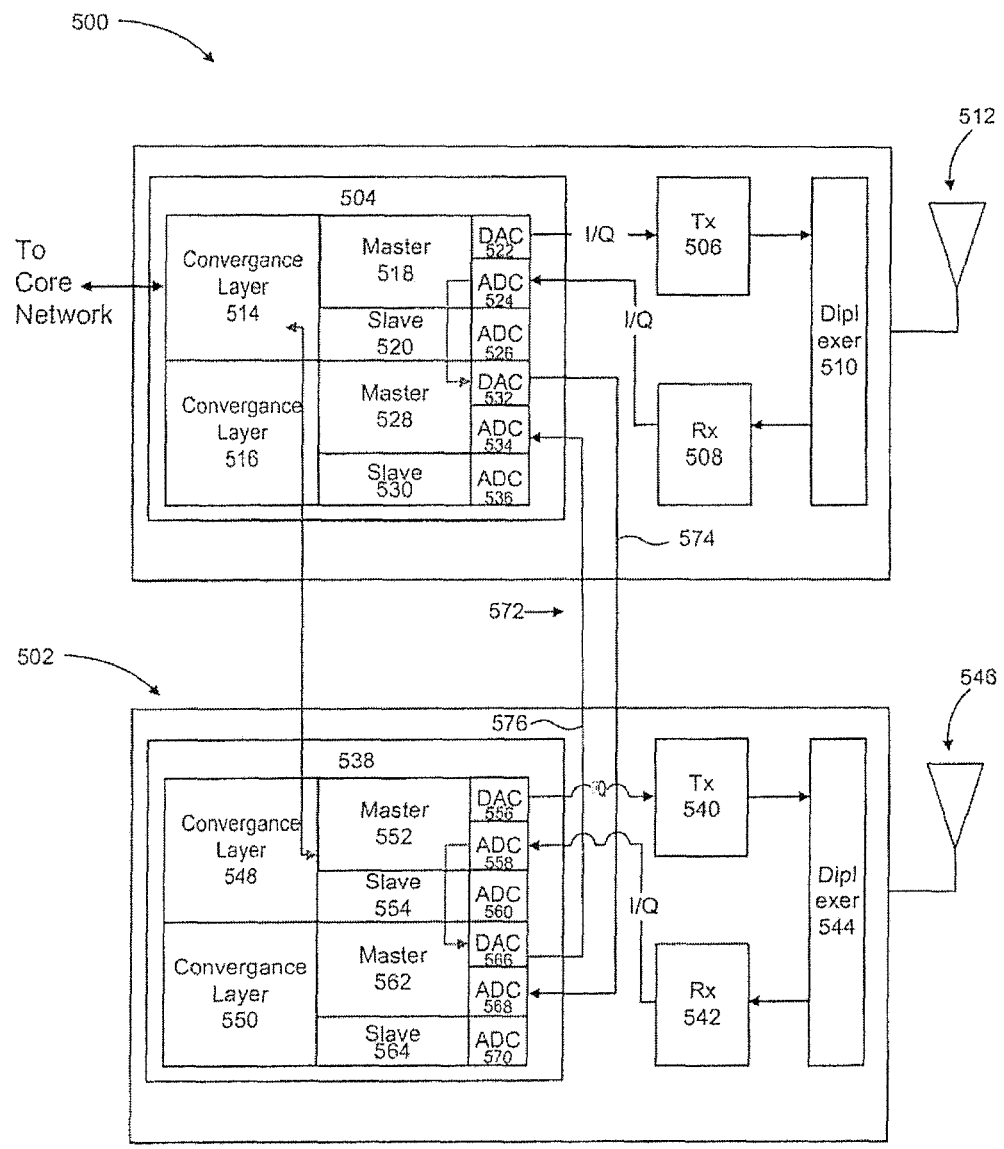
FIG. 5 illustrates a block diagram of a second pair of ODUs, each having a direct conversion architecture, configured to perform cross polarization interference cancellation (XPIC) according to an exemplary embodiment of the present disclosure.

FIG. 5 illustrates a block diagram of a second pair of ODUs 500 and 502, each having a direct conversion architecture, configured to perform cross polarization interference cancellation (XPIC) according to an exemplary embodiment of the present disclosure. ODUs 500 and 502 can represent exemplary embodiments of ODUs 302 and 304 of FIG. 3, respectively.

ODU 500 includes a modem 504, an RF transmission block (Tx) 506, an RF reception block (Rx) 508, and a diplexer 510. Further, ODU 500 may be communicatively coupled to an antenna 512.

Similarly, ODU 502 includes a modem 538, an RF transmission block (Tx) 540, an RF reception block (Rx) 542, and a diplexer 544. Further, ODU 502 may be communicatively coupled to an antenna 546.

Individually, ODUs 500 and 502 can each function in a substantially similar manner to ODUs 400 and 402, which were discussed above with respect to FIG. 4. Therefore, for illustrative purposes only, the description of the common elements between ODUs 500 and 502 and ODUs 400 and 402, and the functionality thereof will be omitted.

During operation, ODU 500 may be configured to receive a signal over a wireless link via antenna 412. In some embodiments, the signal received by ODU 500 may be a horizontally polarized signal. Conversely, ODU 502 may be configured to receive a vertically polarized signal over the wireless link, via antenna 546. Each of the signals received at ODUs 500 and 502 may be an RF signal, and may have a frequency in the range of approximately 6 GHz to approximately 43 GHz.

As discussed above, although ODU 500 may be configured to receive and process the horizontally polarized signal, a portion of the vertically polarized signal may leak into the actual signal received at ODU 500. Similarly, a portion of the horizontally polarized signal may leak into the actual signal received at ODU 502. Each of these leakages may result in noise and/or errors being injected into the signals received at ODUs 500 and 502. Accordingly, an interconnect 572 may be implemented between ODUs 500 and 502 such that the horizontally polarized signal received at ODU 500 can be shared with ODU 502, and such that the vertically polarized signal received at ODU 502 can be shared with ODU 500. By allowing these received signals to be shared between ODUs 500 and 502, noise and/or errors that may be present within these signals can be substantially canceled out. Interconnect 572 may be implemented using various different techniques. For example, interconnect 572 can comprise an Ethernet cable, a fiber optic cable, a coaxial cable, an intermediate frequency (IF) cable, a twisted pair cable, a shielded cable, a category 5 cable, a category 6 cable, or one or more copper wires.

In some embodiments, interconnect 572 may be configured to allow for the communication of IF signals between ODUs 500 and 502, as opposed to communicating I and Q components between the ODU pair (see FIG. 4). In other words, the IF signals are carry the IQ information in a combined manner, as occurs before IQ mixer down-conversion, or after IQ mixer up-conversion. Thus, interconnect 572 may include only a pair of IF communication channels 574 and 576 (e.g. a two pair of wires, or a two coax having a center pin and ground shielding). To facilitate communication of IF signals between ODUs 500 and 502, modem 504 may be configured to up-convert the I and Q signals received at ADC 524 from baseband to IF. In an embodiment, the resulting IF signal produced by modem 504 may have a frequency of approximately 350 MHz. The resulting IF signal may represent at least of portion of the horizontally polarized signal received at ODU 500. Following the up-conversion process, the IF signal may be converted back from the digital domain to the analog domain by DAC 532. In an embodiment, DAC 532 may be a wide-band DAC. The IF signal (e.g. horizontally polarized IF signal) may then be transmitted across IF communication channel 574 from DAC 532 to ADC 568 where the IF signal is sampled and converted from the analog domain back to the digital domain. In an embodiment, ADC 568 may be a wide-band ADC. Modem 538 may be configured to utilize the IF signal received from ODU 500 to cancel out the portion of the horizontally polarized signal that may have leaked into the vertically polarized signal received at ODU 502. Modem 538 may be configured to perform various different error detection and error correction techniques to cancel out the portion of the horizontally polarized signal that may have leaked into the vertically polarized signal received at ODU 502. In some embodiments, modem 538 may be configured to cancel out noise and/or errors by implementing an adaptive error-cancellation (AEC) algorithm or by implementing various digital filtering techniques, to provide some examples.

Similarly, a portion of the vertically polarized signal that may inadvertently leak into the horizontally polarized signal received at ODU 500 may also be canceled out. Specifically, modem 538 may be configured to up-convert the I and Q signals received at ADC 558 from baseband to IF. In an embodiment, the resulting IF signal produced by modem 538 may have a frequency of approximately 140 MHz, which is notably different the IF frequency used by the modem 504 to communicate the portion of the horizontal polarized signal to the modem 502. The resulting IF signal may represent at least of portion of the vertically polarized signal received at ODU 502. Following the up-conversion process, the IF signal may be converted back from the digital domain to the analog domain by DAC 566. In an embodiment, DAC 566 may be a wide-band DAC. The IF signal (e.g. vertically polarized IF signal) may then be transmitted across IF communication channel 576 from DAC 566 to ADC 534 where the IF signal is sampled and converted from the analog domain back to the digital domain. In an embodiment, ADC 534 may be a wide-band ADC. Modem 504 may be configured to utilize the IF signal received from ODU 502 to cancel out the portion of the vertically polarized signal that may have leaked into the horizontally polarized signal received at ODU 500. Similar to modem 538, modem 504 may be configured to perform various different error detection and error correction techniques to cancel out the portion of the vertically polarized signal that may have leaked into the horizontally polarized signal received at ODU 500.

As discussed above, the two IF signals sent between modems 504 and 538 have different IF frequencies (a first and a second IF frequency) that enable a single pair of channels (e.g. two channels) to carry the two IF signals, where one channel is used for each IF frequency. The up-conversion to an IF negates the need to have separate channels for each I and Q pair, since they are combined in their respective IF signal, as discussed. Implementing interconnect 572 having two IF communication channels, rather than having four communication channels (that require eight conductors) for communicating I and Q differential components, substantially reduces or eliminates I/Q mismatches in double capacity microwave backhaul configurations. Therefore, implementing interconnect 572 having two IF communication channels 574 and 576 can substantially eliminate noise floors, which may thus allow ODUs 500 and 502 to operate at relatively high quadrature amplitude modulations (QAMs).

Alternatively, interconnect 572 may be implemented having only a single IF cable, rather than two separate IF communication channels 574 and 576. If interconnect 572 is implemented having only a single IF cable, then modems 504 and 538 may also be configured to filter out and differentiate between the IF signal transmitted from ODU 500 and the IF signals transmitted from ODU 502. For example, modems 504 and 538 may each include one or more bandpass filters configured to filter out and differentiate between the two IF signals based on the respective frequencies (e.g. 140 MHz compared to 350 MHz). Accordingly, a single cable (e.g. coax) or differential pair can simultaneously carry the horizontal polarization information and the vertical polarization information to their respective modems 538,504. Therefore, because of the reduced amount of wires, and communication channels associated with interconnect 572, the relative costs of implementing and operating interconnect 572 can be substantially reduced.

An Exemplary Dual Channel/Dual Antenna all ODU Microwave Backhaul System

Figure 6:
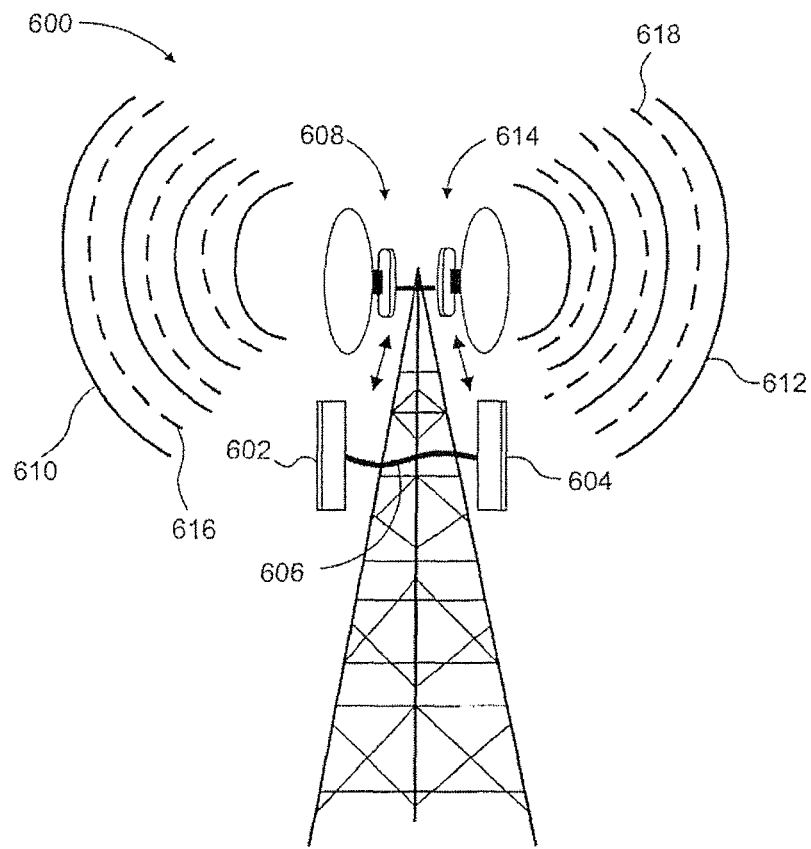
FIG. 6 illustrates a block diagram of a dual channel/dual antenna all ODU microwave backhaul system according to an exemplary embodiment of the present disclosure.

FIG. 6 illustrates a block diagram of a dual channel/dual antenna all ODU microwave backhaul system 600 according to an exemplary embodiment of the present disclosure. As discussed above, in an effort to meet the growing demand for increased capacity, mobile backhaul networks have begun to implement systems that can handle higher capacity communications. Accordingly, dual channel/dual antenna all ODU microwave backhaul system 600 represents a high capacity system that supports both a full cross polarization interference cancellation (XPIC) configuration as well as a multiple-input and multiple-output (MIMO) arrangement.

Similar to dual channel all ODU microwave backhaul system 300 (shown in FIG. 3), dual channel/dual antenna all ODU microwave backhaul system 600 initiates communication by accessing an information source. To facilitate this communication in system 600, ODU 602 is coupled to the core network (not shown in FIG. 6). ODU 602 may be implemented as a direct conversion ODU. Therefore, ODU 602 may be configured to acquire one or more sequences of digital data (e.g., audio data, video data, data transmitted over IP/Ethernet connection, or the like) directly from the core network. ODU 602 can be configured to support several additional services, such as Ethernet, time-division multiplexing (TDM), and control data that is aggregated over a radio link.

Dual channel/dual antenna all ODU microwave backhaul system 600's full XPIC configuration and MIMO arrangement can allow system 600 to have a significantly higher capacity than a single channel configuration. In particular, in additional to ODU 602, dual channel/dual antenna all ODU microwave backhaul system 600 includes a second ODU 604. ODU 602 may be communicatively coupled to a first antenna 608, and ODU 604 may be communicatively coupled to a second antenna 614. ODUs 602 and 604 are each configured to facilitate the communication of two parallel communication channels over the same wireless link, where each of the two communication channels have orthogonal polarizations (e.g. horizontal and vertical).

In some embodiments, dual channel/dual antenna all ODU microwave backhaul system 600 may be implemented such that a first signal having two orthogonal polarizations (e.g. horizontal 610 and vertical 616) is received at first antenna 608. Additionally, system 600 may be implemented such that a second signal having two orthogonal polarizations (e.g. horizontal 612 and vertical 618) is received at second antenna 614. The first received signal having both horizontal polarization 610 and vertical polarization 616 may then be transmitted to ODU 602, while the second received signal having both horizontal polarization 612 and vertical polarization 618 may be transmitted to ODU 604. The first received signal, having horizontal polarization 610 and vertical polarization 616, and the second received signal, having horizontal polarization 612 and vertical polarization 618, may then be respectively processed by ODUs 602 and 604, as will be discussed in greater detail below.

However, although ODU 602 may be configured to receive and process the first signal, a portion of the second signal may leak into the actual signal received at ODU 602. Similarly, a portion of the first signal may leak into the actual signal received at ODU 604. Each of these leakages may result in noise and/or errors being injected into the signals received at ODUs 602 and 604. Accordingly, an interconnect 606 may be implemented between ODUs 602 and 604 such that the first signal received at ODU 602 can be shared with ODU 604, and such that the second signal received at ODU 604 can be shared with ODU 602. By allowing these received signals to be shared between ODUs 602 and 604, noise and/or errors that may be present within these signals can be substantially canceled out.

Interconnect 606 may be implemented using various different techniques. For example, interconnect 606 can comprise an Ethernet cable, a fiber optic cable, a coaxial cable, an intermediate frequency (IF) cable, a twisted pair cable, a shielded cable, a category 5 cable, a category 6 cable, or one or more copper wires.

Further, because of the MIMO arrangement of dual channel/dual antenna all ODU microwave backhaul system 600, each of the ODUs may experience internal cross-polarization leakage as well. For example, horizontally polarized signal 610 may leak into vertically polarized signal 616, and vice versa, even though both signals are received at the same ODU (e.g. ODU 602). Similarly, horizontally polarized signal 612 may leak into vertically polarized signal 618, and vice versa, even though both signals are received at ODU 604. Therefore, ODUs 602 and 604 may each also be configured to perform various digital processing techniques to substantially cancel out internal cross-polarization leakage.

An Exemplary Direct Conversion ODU Pair for Performing XPIC and Utilizing MIMO

FIG. 7 illustrates a block diagram of a pair of ODUs 700 and 702, each having a direct conversion architecture, configured to perform XPIC and to utilize a MIMO arrangement according to an exemplary embodiment of the present disclosure. Specifically, ODUs 700 and 702 may each be configured to achieve polarization diversity as well as spatial diversity. ODUs 700 and 702 may represent exemplary embodiments of ODUs 602 and 604 of FIG. 6, respectively. Individually, ODUs 700 and 702 can each function in a substantially similar manner to the ODU pair consisting of ODUs 500 and 502, which was discussed above with respect to FIG. 5.

Specifically, ODU 700 includes a modem 704, first and second RF transmission blocks (Txs) 706 and 708, first and second RF reception block (Rxs) 710 and 712, and first and second diplexers 714 and 716. Additionally, modem 704 includes an I/Q interface that is configured to exchange in-phase (I) and quadrature (Q) components between Txs 706 and 708 and Rxs 710 and 712. Further, ODU 700 may be communicatively coupled to first and second antennas 718 and 720.

Similarly, ODU 702 includes a modem 722, first and second RF transmission blocks (Txs) 724 and 726, first and second RF reception block (Rxs) 728 and 730, and first and second diplexers 732 and 734. Additionally, modem 722 includes an I/Q interface that is configured to exchange in-phase (I) and quadrature (Q) components between Txs 724 and 726 and Rxs 728 and 730. Further, ODU 702 may be communicatively coupled to first and second antennas 736 and 738.

In some embodiments, modem 704 may be implemented as a point-to-point (PtP), high-end modem having a networking integrated circuit (IC). Modem 704 may also include a first convergence layer 740 and a second convergence layer 742. Each convergence layer 740 and 742 may function in a substantially similar manner was convergence layers 514 and 516 of FIG. 5. Additionally, convergence layer 740 may be associated with a master chip 744 and multiple slave chips 746, 748, 750 and 752. Further, convergence layer 740 may also be associated with multiple DACs 754 and 756 and multiple ADCs 758, 760 and 762. Similarly, convergence layer 742 may be associated with a master chip 764 and multiple slave chips 766, 768, 770 and 772, and may also be associated with a DAC 774 and multiple ADCs 776 and 778.

Similarly, modem 722 may also be implemented as a point-to-point (PtP) high-end modem having a networking integrated circuit (IC). Modem 722 may also include a first convergence layer 780 and a second convergence layer 782. Each convergence layer 780 and 782 may function in a substantially similar manner to first and second convergence layers 740 and 742 discussed above. Additionally, convergence layer 780 may be associated with a master chip 784 and multiple slave chips 785, 786, 787 and 788. Further, convergence layer 780 may also be associated with multiple DACs 789 and 790 and multiple ADCs 791, 792 and 793. Similarly, convergence layer 782 may be associated with a master chip 794 and multiple slave chips 795, 796, 797 and 798, and may also be associated with a DAC 799 and multiple ADCs 781 and 783.

During operation, ODU 700 may receive a signal over a wireless link via first and second antennas 718 and 720. In some embodiments, the signal received by antenna 718 may be a horizontally polarized signal, and the signal received by antenna 720 may be a vertically polarized signal. Additionally, each of the polarized signals may be an RF signal, and may each have a frequency in the range of approximately 6 GHz to approximately 43 GHz. The horizontally polarized signal received at antenna 718 may be input into diplexer 714, which may then output the horizontally polarized signal to Rx 710, without causing any interference with a transmission signal received at diplexer 714 from Tx 706. In particular, diplexer 714 may be configured to allow both Tx 706 and Rx 710 to share a common wireless link. Rx 710 may be configured to directly down-convert the horizontally polarized RF signal to two baseband signals, I and Q. Although, the disclosure is not limited to direct down-conversion. The horizontally polarized I and Q signals may then be input to ADC 758, where the I and Q signals are sampled and converted from the analog domain to the digital domain. Similarly, the vertically polarized signal received at antenna 720 may be input into diplexer 716, which may then output the vertically polarized signal to Rx 712, without causing any interference with a transmission signal received at diplexer 716 from Tx 708. In particular, diplexer 716 may be configured to allow both Tx 708 and Rx 712 to share a common wireless link. Rx 712 may be configured to directly down-convert the vertically polarized RF signal to two baseband signals, I and Q. Although, the disclosure is not limited to direct down-conversion. The vertically polarized I and Q signals may then be input to ADC 776, where the I and Q signals are sampled and converted from the analog domain to the digital domain.

Modem 704 may be configured to perform various digital processing techniques on both the horizontally polarized and the vertically polarized I and Q signals. For example, modem 704 may be configured to digitally filter each of the received I and Q signals, to perform adaptive digital pre-distortion techniques, to correct noise and/or errors in each of the received I and Q signals, or the like.

As discussed above, although ODU 700 may be configured to receive and process the horizontally polarized signal independently from the vertically polarized signal, a portion of the vertically polarized signal may leak into the actual signal received at antenna 718. Similarly, a portion of the horizontally polarized signal may leak into the actual signal received at antenna 720. Each of these leakages may result in noise and/or errors being injected into the signals received at first and second antennas 718 and 720. Accordingly, modem 704 may also be configured to share the horizontally polarized signal with the vertically polarized signal, and vice versa. Specifically, modem 704 may utilize at least a portion of the horizontally polarized signal received at antenna 718 to cancel out a portion of the horizontally polarized signal that may have leaked into the vertically polarized signal received at antenna 720. Similarly, modem 704 may utilize at least a portion of the vertically polarized signal received at antenna 720 to cancel out a portion of the vertically polarized signal that may have leaked into the horizontally polarized signal received at antenna 718. Modem 704 may be configured to substantially cancel out the cross-polarization leakage by performing various digital processing techniques. For example, modem 704 may be configured to cancel out cross-polarization leakage by implementing an adaptive error-cancellation (AEC) algorithm or by implementing some other digital sharing technique. For example, the cross-polarization leakage may be canceled by implementing the method discussed in FIGS. 4 and 5, which is not indicated in FIG. 7 for clarity of illustration.

In some embodiments, modem 704 may output the digitally processed I and Q signals (having substantially eliminated the cross-polarization leakage that may have been present) to the core network via a switch 779. Additionally, or alternatively, modem 704 may output the digitally processed I and Q signals to modem 722, either directly or via a field-programmable gate array (FPGA) 775 and/or a serializer FPGA 777.

ODU 702 may operate in a substantially similar manner to ODU 700. Therefore, during operation, ODU 702 may receive a signal over a wireless link via first and second antennas 736 and 738. In some embodiments, the signal received by antenna 736 may be a horizontally polarized signal, and the signal received by antenna 738 may be a vertically polarized signal. Additionally, each of the polarized signals may be an RF signal, and may each have a frequency in the range of approximately 6 GHz to approximately 43 GHz. The horizontally polarized signal received at antenna 736 may be input into diplexer 732, which may then output the horizontally polarized signal to Rx 728, without causing any interference with a transmission signal received at diplexer 732 from Tx 724. In particular, diplexer 732 may be configured to allow both Tx 724 and Rx 728 to share a common wireless link. Rx 728 may be configured to directly down-convert the horizontally polarized RF signal to two baseband signals, I and Q. Although, the disclosure is not limited to direct down-conversion. The horizontally polarized I and Q signals may then be input to ADC 791, where the I and Q signals are sampled and converted from the analog domain to the digital domain.

Similarly, the vertically polarized signal received at antenna 738 may be input into diplexer 734, which may then output the vertically polarized signal to Rx 730, without causing any interference with a transmission signal received at diplexer 734 from Tx 726. In particular, diplexer 734 may be configured to allow both Tx 726 and Rx 730 to share a common wireless link. Rx 730 may be configured to directly down-convert the vertically polarized RF signal to two baseband signals, I and Q. Although, the disclosure is not limited to direct down-conversion. The vertically polarized I and Q signals may then be input to ADC 781, where the I and Q signals are sampled and converted from the analog domain to the digital domain.

Modem 722 may also be configured to perform various digital processing techniques on both the horizontally polarized and the vertically polarized I and Q signals. For example, modem 722 may be configured to digitally filter each of the received I and Q signals, to perform adaptive digital pre-distortion techniques, to correct noise and/or errors in each of the received I and Q signals, or the like.

As discussed above, although ODU 702 may be configured to receive and process the horizontally polarized signal independently from the vertically polarized signal, a portion of the vertically polarized signal may leak into the actual signal received at antenna 736. Similarly, a portion of the horizontally polarized signal may leak into the actual signal received at antenna 738. Each of these leakages may result in noise and/or errors being injected into the signals received at first and second antennas 736 and 738. Accordingly, modem 722 may also be configured to share the horizontally polarized signal with the vertically polarized signal, and vice versa. Specifically, modem 722 may utilize at least a portion of the horizontally polarized signal received at antenna 736 to cancel out the portion of the horizontally polarized signal that may have leaked into the vertically polarized signal received at antenna 738. Similarly, modem 722 may utilize at least a portion of the vertically polarized signal received at antenna 738 to cancel out the portion of the vertically polarized signal that may have leaked into the horizontally polarized signal received at antenna 736. Modem 722 may be configured to substantially cancel out the cross-polarization leakage by performing various digital processing techniques. For example, modem 722 may be configured to cancel out cross-polarization leakage by implementing an adaptive error-cancellation (AEC) algorithm or by implementing some other digital sharing technique. For example, the cross-polarization leakage may be canceled by implementing the method discussed in FIGS. 4 and 5, which is not indicated in FIG. 7 for clarity of illustration.

In some embodiments, modem 722 may output the digitally processed I and Q signals (having substantially eliminated the cross-polarization leakage that may have been present) to ODU 700, either directly or via serializer FPGA 777.

In addition to the cross-polarization leakage, which may occur internally within each ODU, leakage may also occur between the ODUs. Specifically, although ODU 700 may be configured to receive and process a horizontally polarized signal at antenna 718 and a vertically polarized signal at antenna 720, a portion of the vertically polarized signal received by ODU 702 at antenna 738 and/or a portion of the horizontally polarized signal received by ODU 702 at antenna 736 may leak into the actual signals received by ODU 700. The leakage of the vertically polarized signal received at antenna 738 and/or the horizontally polarized signal received at antenna 736 may ultimately affect either the horizontally polarized signal received at antenna 718, the vertically polarized signal received at antenna 720, or both of these polarized signals received by ODU 700.

Similar to the internal cross-polarization leakage discussed above, the leakage that may occur between the ODUs may also result in noise and/or errors being injected into the signals received at ODUs 700 and 702. Accordingly, an interconnect 773 is also implemented between ODUs 700 and 702 such that both of the polarized signals received at ODU 700 can be shared with ODU 702, and such that both of the polarized signals received at ODU 702 can be shared with ODU 700. By allowing these received signals to be shared between ODUs 700 and 702, noise and/or errors that may be present within these signals can be substantially canceled out. Interconnect 773 may be implemented using various different techniques. For example, interconnect 773 can comprise an Ethernet cable, a fiber optic cable, a coaxial cable, an intermediate frequency (IF) cable, a twisted pair cable, a shielded cable, a category 5 cable, a category 6 cable, or one or more copper wires.

In some embodiments, interconnect 773 may be configured to allow for the communication of IF signals between ODUs 700 and 702. Thus, interconnect 773 may include two pairs of IF communication channels 769 and 771. To facilitate communication of IF signals between ODUs 700 and 702, modem 704 may be configured to up-convert the horizontally polarized I and Q signals received at ADC 758, as well as the vertically polarized I and Q signals received at ADC 776, from baseband to IF. In an embodiment, the resulting IF signals produced by modem 504 may each have different frequencies, which may be in the range of approximately 140 MHz to approximately 350 MHz. The two resulting IF signals may represent at least of portion of the horizontally polarized signal received at antenna 718 and at least a portion of the vertically polarized signal received at antenna 720. Following the up-conversion process, each of the IF signals may be converted back from the digital domain to the analog domain by DAC 756. In an embodiment, DAC 756 may be a wide-band DAC. The two IF signals (e.g. first horizontally polarized IF signal and first vertically polarized IF signal) may then be transmitted across IF communication channel pair 769 from DAC 756 to ADC 793 where the IF signals are sampled and converted from the analog domain back to the digital domain. In an embodiment, ADC 793 may be a wide-band ADC. Modem 722 may be configured to utilize the two IF signal received from ODU 700 to cancel out the portion of the horizontally polarized signal, or the portion of the vertically polarized signal, that may have leaked into either of the polarized signals received at ODU 702. Modem 722 may be configured to perform various different error detection and error correction techniques to cancel out the portion of the horizontally polarized signal, or the portion of the vertically polarized signal, that may have leaked into the polarized signals received at ODU 702. In some embodiments, modem 722 may be configured to cancel out noise and/or errors by implementing an adaptive error-cancellation (AEC) algorithm or by implementing various digital filtering techniques, to provide some examples.

Similarly, a portion of the vertically polarized signal, or a portion of the horizontally polarized signal, that may inadvertently leak into the polarized signals received at ODU 700 may also be canceled out. Specifically, modem 722 may be configured to up-convert the horizontally polarized I and Q signals received at ADC 791, as well as the vertically polarized I and Q signals received at ADC 781, from baseband to IF. In an embodiment, the resulting IF signals produced by modem 722 may each have different frequencies, which may be in the range of approximately 140 MHz to approximately 350 MHz. The two resulting IF signals may represent at least of portion of the horizontally polarized signal received at antenna 736 and at least a portion of the vertically polarized signal received at antenna 738. Following the up-conversion process, each of the IF signals may be converted back from the digital domain to the analog domain by DAC 790. In an embodiment, DAC 790 may be a wide-band DAC. The two IF signals (e.g. first horizontally polarized IF signal and first vertically polarized IF signal) may then be transmitted across IF communication channel pair 771 from DAC 790 to ADC 762 where the IF signals are sampled and converted from the analog domain back to the digital domain. In an embodiment, ADC 762 may be a wide-band ADC. Modem 704 may be configured to utilize the two IF signals received from ODU 702 to cancel out the portion of the horizontally polarized signal, or the portion of the vertically polarized signal, that may have leaked into either of the polarized signals received at ODU 700. Similar to modem 722, modem 704 may be configured to perform various different error detection and error correction techniques to cancel out the portion of the horizontally polarized signal, or the portion of the vertically polarized signal, that may have leaked into either of the polarized signals received at ODU 700.

In some embodiments, by implementing interconnect 773 having two pairs of IF communication channels 769 and 771, rather than having four communication channels (requiring eight conductors) for communicating I and Q components, I/Q mismatches that may have affected other high capacity microwave backhaul configurations can be substantially eliminated. Therefore, implementing interconnect 773 having two pairs of IF communication channels 769 and 771 can substantially eliminate noise floors, which may thus allow ODUs 700 and 702 to operate at relatively high quadrature amplitude modulations (QAMs).

Alternatively, interconnect 773 may be implemented having only a single IF cable, rather two pairs of IF communication channels 769 and 771. Therefore, interconnect 773 may be implemented as a single IF cable having the ability to communicate at least four different signals having four different frequencies. If interconnect 773 is implemented having only a single IF cable, then modems 704 and 722 may also be configured to filter out and differentiate between the four different IF signals transmitted between ODUs 700 and 702. For example, modems 704 and 722 may each include one or more bandpass filters configured to filter out and differentiate between the IF signals based on the respective frequencies. Therefore, because of the reduced amount of wires, and communication channels associated with interconnect 773, the relative costs of implementing and operating interconnect 773 can be substantially reduced.

An Exemplary Method of Optimizing Communications within a High Capacity all ODU Microwave Backhaul System FIG. 8 is a flowchart of exemplary operational steps of optimizing communications within a high capacity all ODU microwave backhaul system, having a direct conversion architecture, according to an exemplary embodiment of the present disclosure. The flowchart of FIG. 8 is described with reference to embodiments of FIGS. 1-7. However, a method 800 is not limited to these embodiments. The order of the steps in method 800 are not meant to be limiting, as at least a portion of the steps could be performed in a different order, or simultaneously, and still be within the scope and spirit of the disclosure.

Method 800 beings at step 802 where a determination is made as to whether the microwave backhaul system is configured to have a multiple-input and multiple-output (MIMO) arrangement. If the microwave backhaul system does not have a MIMO arrangement, then the method proceeds to step 804.

In step 804, a horizontally polarized signal is received at a first outdoor unit (ODU), such as ODU 500, to provide an example.

In step 806, a vertically polarized signal is received at a second ODU, such as ODU 502, to provide an example.

In step 808, the horizontally polarized signal is converted (e.g. down-converted) into a first in-phase (I) component and a first quadrature (Q) component by a first RF reception block (Rx), such as Rx 508, to provide an example. For example, the horizontally polarized signal may be down-converted to baseband, resulting in the first I and Q components.

In step 810, the vertically polarized signal is converted (e.g. down-converted) into a second I component and a second Q component by a second RF reception block (Rx), such as Rx 542, to provide an example. For example, the vertically polarized signal may be down-converted to baseband, resulting in the second I and Q components.

In step 812, the first I and Q components are up-converted from baseband into a horizontally polarized intermediate frequency (IF) signal by a first modem, such as modem 504, to provide an example.

In step 814, the second I and Q components are up-converted from baseband into a vertically polarized IF signal by a second modem, such as modem 538, to provide an example.

In step 816, the horizontally polarized IF signal is shared with the second ODU. The horizontally polarized IF signal may be transmitted from the first ODU to the second ODU via an IF communication channel included within an interconnect, such as IF communication channel 574 included within interconnect 572, to provide an example.

In step 818, the vertically polarized IF signal is shared with the first ODU. The vertically polarized IF signal may be transmitted from the second ODU to the first ODU via a second IF communication channel included within the interconnect, such as IF communication channel 576 included within interconnect 572, to provide an example.

In step 820, the first modem utilizes the vertically polarized IF signal received from the second ODU to substantially cancel out a first external cross-polarization leakage, or at least a portion of the first external cross-polarization leakage. The first external cross-polarization leakage may be caused by the vertically polarized received signal leaking into the horizontally polarized signal received at the first ODU.

In step 820, the second modem utilizes the horizontally polarized IF signal received from the first ODU to substantially cancel out a second external cross-polarization leakage, or at least the portion of a second external cross-polarization leakage. The second external cross-polarization leakage may be caused by the horizontally polarized received signal leaking into the vertically polarized signal received at the second ODU.

Returning to step 802, if the microwave backhaul system does have a MIMO arrangement, then the method proceeds to step 824.

In step 824, a first horizontally polarized signal and a first vertically polarized signal are received at a first ODU, such as ODU 700, to provide an example.

In step 826, a second horizontally polarized signal and a second vertically polarized signal are received at a second ODU, such as ODU 702, to provide an example.

In step 828, the first horizontally polarized signal and the first vertically polarized signal are converted (e.g. down-converted) into a first and second I component and a first and second Q component, respectively, by a first and a second RF reception block (Rx), such as Rxs 710 and 712, to provide an example.

In step 830, the second horizontally polarized signal and the second vertically polarized signal are converted (e.g. down-converted) into a third and a fourth I component and a third and a fourth Q component, respectively, by a third and a fourth RF reception block (Rx), such as Rxs 728 and 730, to provide an example.

In step 832, the first and second I and Q components are up-converted from baseband into a first horizontally polarized IF signal and a first vertically polarized IF signal, respectively, by a first modem, such as modem 704, to provide an example.

In step 834, the third and fourth I and Q components are up-converted from baseband into a second horizontally polarized IF signal and a second vertically polarized IF signal, respectively, by a second modem, such as modem 722, to provide an example.

In step 836, the first horizontally polarized IF signal and the first vertically polarized IF signal are shared with the second ODU. The first horizontally polarized IF signal and the first vertically polarized IF signal may be transmitted from the first ODU to the second ODU via a pair of IF communication channels included within an interconnect, such as IF communication channel pair 769 included within interconnect 773, to provide an example.

In step 838, the second horizontally polarized IF signal and the second vertically polarized IF signal are shared with the first ODU. The second horizontally polarized IF signal and the second vertically polarized IF signal may be transmitted from the second ODU to the first ODU via a second pair of IF communication channels included within an interconnect, such as IF communication channel pair 771 included within interconnect 773, to provide an example.

In step 840, the first modem utilizes the second horizontally polarized IF signal and the second vertically polarized IF signal received from the second ODU to substantially cancel out a first external cross-polarization leakage, or at least a portion of the first external cross-polarization leakage. The first external cross-polarization leakage may be caused by the second horizontally polarized received signal and the second vertically polarized received signal leaking into the first horizontally polarized signal and the first vertically polarized signal received at the first ODU.

In step 842, the second modem utilizes the first horizontally polarized IF signal and the first vertically polarized IF signal received from the first ODU to substantially cancel out a second external cross-polarization leakage, or at least a portion of the second external cross-polarization leakage. The second external cross-polarization leakage may be caused by the first horizontally polarized received signal and the first vertically polarized received signal leaking into the second horizontally polarized signal and the second vertically polarized signal received at the second ODU.

In step 844, the first modem cancels out a first internal cross-polarization leakage between the first horizontally polarized received signal and the first vertically polarized received signal, or at least a portion of the first internal cross-polarization leakage.

In step 846, the second modem cancels out a second internal cross-polarization leakage between the second horizontally polarized received signal and the second vertically polarized received signal, or at least a portion of the second internal cross-polarization leakage.

The disclosure has been described in terms of an all outdoor unit communications system, that may be used for example, in point to point radio or microwave communications. However, this disclosure is not limited to such and may be used in any communications system that has horizontal and vertical signal interference, or any other communications system, where one signal interferes with another.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A communication system for performing cross polarization interference cancellation (XPIC), comprising:
a first outdoor unit (ODU) configured to receive a first directionally polarized signal;
a first radio frequency (RF) module, implemented within the first ODU, configured to down-convert the first directionally polarized signal into a first in-phase (I) component and a first quadrature (Q) component;
a first modem, implemented within the first ODU, configured to up-convert the first I and Q components from baseband into a first directionally polarized intermediate frequency (IF) signal; and
an interconnect, coupled to the first ODU, configured to communicate a second directionally polarized IF signal to the first ODU, and wherein the first modem is further configured to utilize the second directionally polarized IF signal to cancel out at least a portion of a first cross-polarization leakage at the first ODU.

2. The communication system of claim 1, wherein the second directionally polarized IF signal is received from a second ODU having a second RF module and a second modem.

3. The communication system of claim 2, wherein the first cross-polarization leakage is caused by a second directionally polarized signal, received at the second ODU, leaking into the first directionally polarized signal, received at the first ODU.

4. The communication system of claim 2, wherein the interconnect is further configured to communicate the first directionally polarized IF signal to the second ODU, and wherein the second modem is configured to utilize the first directionally polarized IF signal to cancel out at least a portion of a second cross-polarization leakage at the second ODU.

5. The communication system of claim 4, wherein the second cross-polarization leakage is caused by the first directionally polarized signal leaking into the second directionally polarized signal received at the second ODU.

6. The communication system of claim 1, wherein the interconnect includes two IF communication channels.

7. The communication system of claim 2, wherein the interconnect includes a single IF communication channel.

8. The communication system of claim 1, wherein the first directionally polarized IF signal has a first frequency, and wherein the second directionally polarized IF signal has a second frequency that is different from the first frequency.

9. The communication system of claim 1, wherein the interconnect is further configured to substantially eliminate I/Q mismatches.

10. A method of reducing interference in a communication system, comprising:
receiving a first directionally polarized signal at a first outdoor unit (ODU);
down-converting the first directionally polarized signal to baseband, resulting in a first in-phase (I) component and a first quadrature (Q) component;
up-converting the first I and Q components from baseband into a first directionally polarized intermediate frequency (IF) signal;
receiving a second directionally polarized IF signal at the first ODU via an interconnect; and
utilizing the second directionally polarized IF signal to cancel out at least a portion of a first cross-polarization leakage at the first ODU.

11. The method of claim 10, further comprising:
receiving a second directionally polarized signal at a second ODU;
down-converting the second directionally polarized signal to baseband, resulting in a second I component and a second Q component;
up-converting the second I and Q components from baseband into the second directionally polarized IF signal; and
utilizing the first directionally polarized IF signal to cancel out at least portion of a second cross-polarization leakage at the second ODU.

12. The method of claim 11, further comprising:
receiving a third directionally polarized signal at the first ODU;
receiving a fourth directionally polarized signal at the second ODU;
canceling at least a portion of a first internal cross-polarization leakage between the first directionally polarized signal received at the first ODU and the third directionally polarized signal received at the first ODU; and
canceling at least a portion of a second internal cross-polarization leakage between the second directionally polarized signal received at the second ODU and the fourth directionally polarized signal received at the second ODU.

13. The communication system of claim 1, further comprising convergence layer, implemented within the first ODU, configured to add at least one of error control information and priority information to the first directionally polarized signal.

14. The communication system of claim 4, wherein the first directionally polarized IF signal transmitted to the second ODU has a frequency of approximately 350 MHz, and wherein the second directionally polarized IF signal transmitted to the first ODU has a frequency of approximately 140 MHz.

15. The communication system of claim 7, wherein the first and second modems each include at least one bandpass filter configured to filter out and differentiate between the first directionally polarized IF signal and the second directionally polarized IF signal based on a respective frequency of each signal.

16. A communication system for performing cross polarization interference cancellation (XPIC) and utilizing a multiple-input and multiple-output (MIMO) arrangement, comprising:
a first outdoor unit (ODU) configured to receive a first horizontally polarized signal and a first vertically polarized signal;
a first radio frequency (RF) module, implemented within the first ODU, configured to down-convert the first horizontally polarized signal into a first in-phase (I) component and a first quadrature (Q) component;
a second RF module, implemented within the first ODU, configured to down-convert the first vertically polarized signal into a second I component and a second Q component;
a first modem, implemented within the first ODU, configured to up-convert the first I and Q components from baseband into a first horizontally polarized intermediate frequency (IF) signal and to up-convert the second I and Q components from baseband into a first vertically polarized IF signal; and
an interconnect, coupled to the first ODU, configured to communicate a second horizontally polarized IF signal and a second vertically polarized IF signal to the first ODU, and wherein the first modem is further configured to utilize the second horizontally polarized IF signal and the second vertically polarized IF signal to cancel out at least a portion of a first cross-polarization leakage at the first ODU.

17. The communication system of claim 16, wherein the second horizontally polarized IF signal and the second vertically polarized IF signal are received from a second ODU having a third and fourth RF module and a second modem.

18. The communication system of claim 17, wherein the interconnect is further configured to communicate the first horizontally polarized IF signal and the first vertically polarized IF signal to the second ODU, and wherein the second modem is further configured to utilize the first horizontally polarized IF signal and the first vertically polarized IF signal to cancel out at least a portion of a second cross-polarization leakage at the second ODU.

19. The communication system of claim 16, wherein the first modem is further configured to cancel out at least a portion of a first internal cross-polarization leakage between the first horizontally polarized signal and the first vertically polarized signal.

20. The communication system of claim 18 wherein the first cross-polarization leakage is caused by a second horizontally polarized signal and a second vertically polarized signal, both received at the second ODU, leaking into the first horizontally polarized signal and the first vertically polarized signal, received at the first ODU.

21. The communication system of claim 20, wherein the second modem is further configured to cancel out at least a portion of a second internal cross-polarization leakage between the second horizontally polarized signal and the second vertically polarized signal.

22. The communication system of claim 20, wherein the second cross-polarization leakage is caused by the first horizontally polarized signal and the first vertically polarized signal leaking into the second horizontally polarized signal and the second vertically polarized signal received at the second ODU.

23. The communication system of claim 16, wherein the interconnect includes four IF communication channels.

* * * * *